US011832327B2

(12) United States Patent
Otaka

(10) Patent No.: US 11,832,327 B2
(45) Date of Patent: Nov. 28, 2023

(54) CONTROL SYSTEM, MOBILE OBJECT, CONTROL METHOD, AND COMPUTER-READABLE STORAGE MEDIUM

(71) Applicant: HONDA MOTOR CO., LTD., Tokyo (JP)

(72) Inventor: Masaru Otaka, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 62 days.

(21) Appl. No.: 17/560,294

(22) Filed: Dec. 23, 2021

(65) Prior Publication Data
US 2022/0225458 A1 Jul. 14, 2022

(30) Foreign Application Priority Data

Jan. 13, 2021 (JP) ................................ 2021-003339

(51) Int. Cl.
*H04W 76/18* (2018.01)
*H04W 60/00* (2009.01)

(52) U.S. Cl.
CPC .......... *H04W 76/18* (2018.02); *H04W 60/00* (2013.01)

(58) Field of Classification Search
CPC ..... H04W 76/18; H04W 48/08; H04W 76/27; H04W 36/0055; H04W 8/02;
(Continued)

(56) References Cited

U.S. PATENT DOCUMENTS

2012/0189016 A1* 7/2012 Bakker ................ H04W 76/11
370/401
2016/0112941 A1* 4/2016 Desai .................... H04L 12/145
370/329
(Continued)

FOREIGN PATENT DOCUMENTS

CN 110313167 A 10/2019
JP 2003152631 A 5/2003
(Continued)

OTHER PUBLICATIONS

Office Action issued for counterpart Japanese Application No. 2021-003339, issued by the Japanese Patent Office dated Aug. 23, 2022 (drafted on Aug. 16, 2022).
(Continued)

*Primary Examiner* — Dung Hong

(57) ABSTRACT

A control system includes: a mobile object controller configured to control a mobile object; and a communications controller configured to control mobile communications via a mobile communications network. When the communications controller requests attachment to the mobile communications network and acquires rejection information of the attachment to the mobile communications network having been rejected, the communications controller is configured to notify the mobile object controller that the attachment has been rejected. A control method includes: requesting attachment to a mobile communications network; and when rejection information of the attachment to the mobile communications network having been rejected is acquired, notifying a mobile object controller connected to a network inside a mobile object and configured to control the mobile object that the attachment has been rejected.

19 Claims, 7 Drawing Sheets

(58) Field of Classification Search
CPC . H04W 76/19; H04W 76/10; H04W 36/0005; H04W 60/00
See application file for complete search history.

(56) References Cited

U.S. PATENT DOCUMENTS

| | | | |
|---|---|---|---|
| 2016/0119844 A1 | 4/2016 | Uchino | |
| 2017/0118203 A1 | 4/2017 | Wirtanen | |
| 2017/0118693 A1* | 4/2017 | Tsuboi | H04W 76/14 |
| 2019/0208495 A1 | 7/2019 | Takahashi | |
| 2019/0373671 A1* | 12/2019 | Kamata | H04W 64/003 |
| 2020/0053541 A1 | 2/2020 | Makabe | |

FOREIGN PATENT DOCUMENTS

| | | | |
|---|---|---|---|
| JP | 2004040461 A * | 2/2004 | |
| JP | 2009246772 A | 10/2009 | |
| JP | 2013045420 A * | 3/2013 | |
| JP | 2014115741 A | 6/2014 | |
| JP | 2014236354 A | 12/2014 | |
| WO | 2018030281 A1 | 2/2018 | |
| WO | 2018155416 A1 | 8/2018 | |
| WO | 2018194125 A1 | 10/2018 | |
| WO | WO-2019138359 A1 * | 7/2019 | |

OTHER PUBLICATIONS

Office Action issued for counterpart Japanese Application No. 2021-003339, issued by the Japanese Patent Office dated Dec. 6, 2022 (drafted on Nov. 30, 2022).

Office Action issued for counterpart Chinese Application 202111498199.1, issued by the State Intellectual Property Office of People's Republic of China dated Apr. 22, 2023.

* cited by examiner

| DATE AND TIME | VEHICLE INFORMATION | ACCEPTANCE FLAG |
|---|---|---|
| 2020-11-11 9:00:00 | VEHICLE INFORMATION1 | 1 |
| 2020-11-12 9:10:00 | VEHICLE INFORMATION2 | 0 |
| ... | ... | ... |

FIG.6

CONTROL SYSTEM, MOBILE OBJECT, CONTROL METHOD, AND COMPUTER-READABLE STORAGE MEDIUM

The contents of the following Japanese patent application(s) are incorporated herein by reference:
NO. 2021-003339 filed on Jan. 13, 2021.

BACKGROUND

1. Technical Field

The present invention relates to a control system, a mobile object, a control method, and a computer-readable storage medium.

2. Related Art

Patent document 1 discloses a technique regarding bearer establishment between a mobile communications device (UE) and a wireless communications base station apparatus, which is an evolved node B (eNB).

PRIOR ART DOCUMENTS

Patent Documents

Patent document 1: Japanese patent application publication No. 2009-246772.

BRIEF DESCRIPTION OF THE DRAWINGS

FIG. 6 illustrates a data configuration of vehicle data collected and stored by an ECU 220.

DESCRIPTION OF EXEMPLARY EMBODIMENTS

The present invention will now be described using embodiments of the invention. The following embodiments are not to limit the present invention according to the appended claims. All combinations of features described in the embodiments are not necessarily essential to solutions provided by the present invention.

Figure 1:
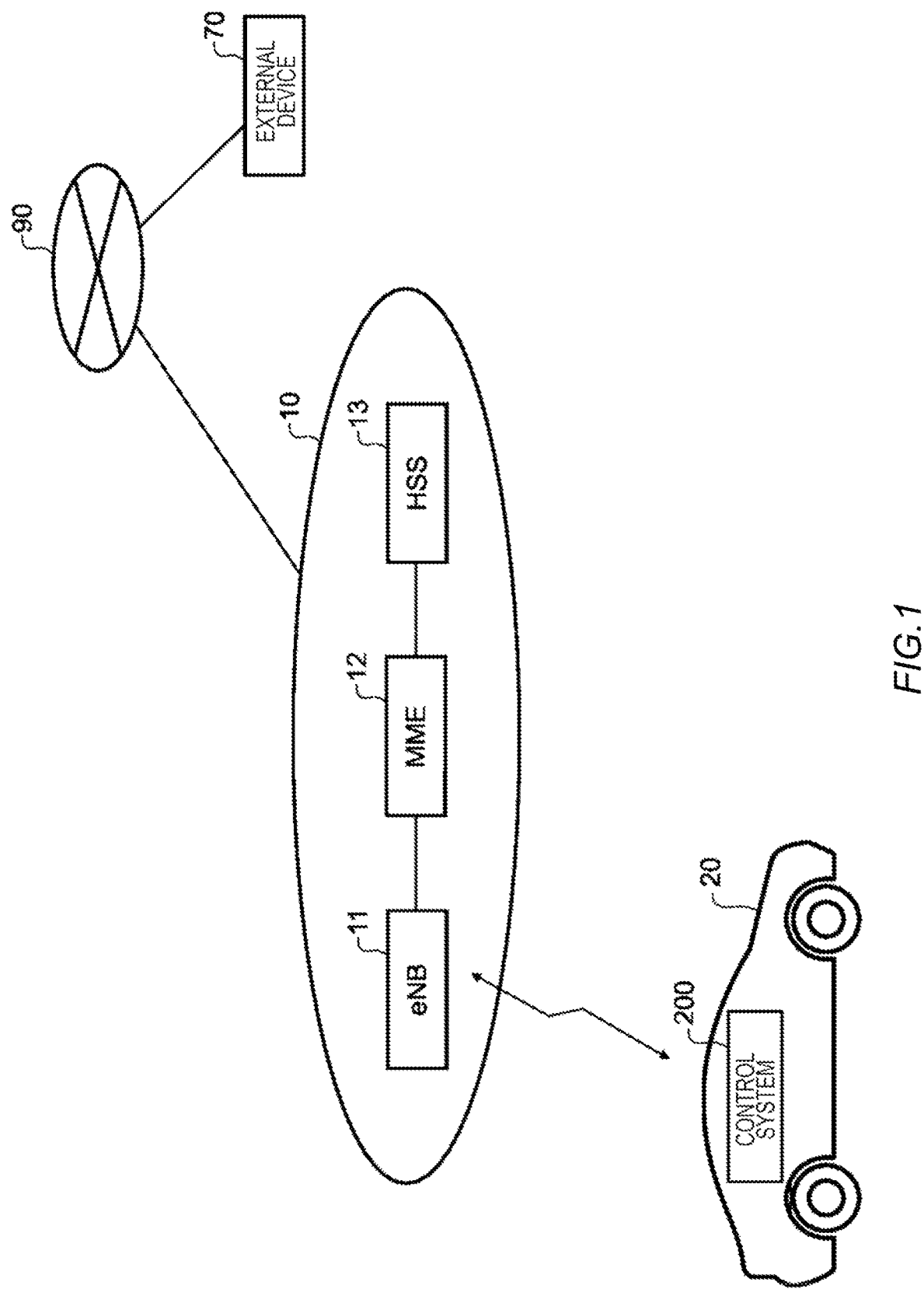
FIG. 1 schematically illustrates a communications environment of a vehicle 20 according to an embodiment.

FIG. 1 schematically illustrates a communications environment of a vehicle 20 according to an embodiment. The vehicle 20 includes a control system 200. The control system 200 controls the vehicle 20, communicates with a mobile communications network 10, and communicates with an external device 70 via the mobile communications network 10 and a communications network 90. The communications network 90 may include an IP network such as the Internet, a P2P network, a dedicated line including a VPN, and a virtual network.

In this embodiment, an LTE network will be given as an example of the mobile communications network 10. The mobile communications network 10 includes an eNB 11, an MME 12, and an HSS 13. The eNB 11 is an evolved node B (a wireless base station). The eNB 11 controls wireless communications with user equipment (UE) including the control system 200. The MME 12 is a mobility management entity. The MME 12 constitutes part of a core network in the mobile communications network 10. The MME 12 contains the eNB 11 and performs position registration, paging, movement control such as handover, and bearer establishment and deletion. The MME 12 also performs user authentication in cooperation with the HSS 13. The HSS 13 is a home subscriber server and manages, as subscriber information, position information such as within-range information, user contract information, authentication information and the like of a mobile communications device. The mobile communications network 10 is connected to the communications network 90 via a serving gateway (S-GW) and a packet data network gateway (P-GW) that constitute part of the core network.

In the vehicle 20, the control system 200 controls the vehicle 20 and transmits vehicle data including position information of the vehicle 20 and state information of the vehicle 20 to the external device 70 via the mobile communications network 10 and the communications network 90. The external device 70 stores the vehicle data received from the control system 200.

When an ignition (IG) power source of the vehicle 20 is turned on, for example, the control system 200 requests position registration from the eNB 11 so as to perform attachment to the mobile communications network 10. Based on authentication information notified by the HSS 13, the MME 12 performs user authentication and determines whether to perform position registration. When the user authentication ends unsuccessfully, the MME 12 transmits a position registration rejection signal to the control system 200 via the eNB 11 as rejection information of rejecting the attachment to the mobile communications network 10.

Upon receiving the rejection information from the eNB 11, the control system 200 notifies a vehicle controller for controlling the vehicle 20 that the attachment has been rejected. When notified that the attachment has been rejected, the vehicle controller of the control system 200 controls the vehicle 20 in an operation mode predetermined for a case of rejection of the attachment. For example, the vehicle controller of the control system 200 controls the vehicle 20 in an operation mode for disallowing mobile communications. In one example, the vehicle controller of the control system 200 switches a wireless communications mode for communications with an outside to a short-distance wireless communications mode such as wireless LAN or Bluetooth (registered trademark).

Upon receiving the rejection information from the eNB 11, the vehicle controller of the control system 200 sets a value indicating "rejected" at an acceptance flag as internal information. The vehicle controller of the control system 200 stores the vehicle data concerning the vehicle 20 in association with the acceptance flag. When the vehicle data associated with the acceptance flag indicating "rejected" is transmitted to the external device 70, the vehicle controller of the control system 200 masks a predetermined kind of data among the vehicle data and transmits the same to the external device 70. In one example, the vehicle controller of the control system 200 masks data concerning an individual associated with the vehicle 20, such as position information of the vehicle 20, and transmits the same to the external device 70.

With the control system 200, the vehicle controller of the control system 200 can refer to user authentication rejection information in the mobile communications network 10 to control the vehicle 20 and manage the vehicle data.

Figure 2:
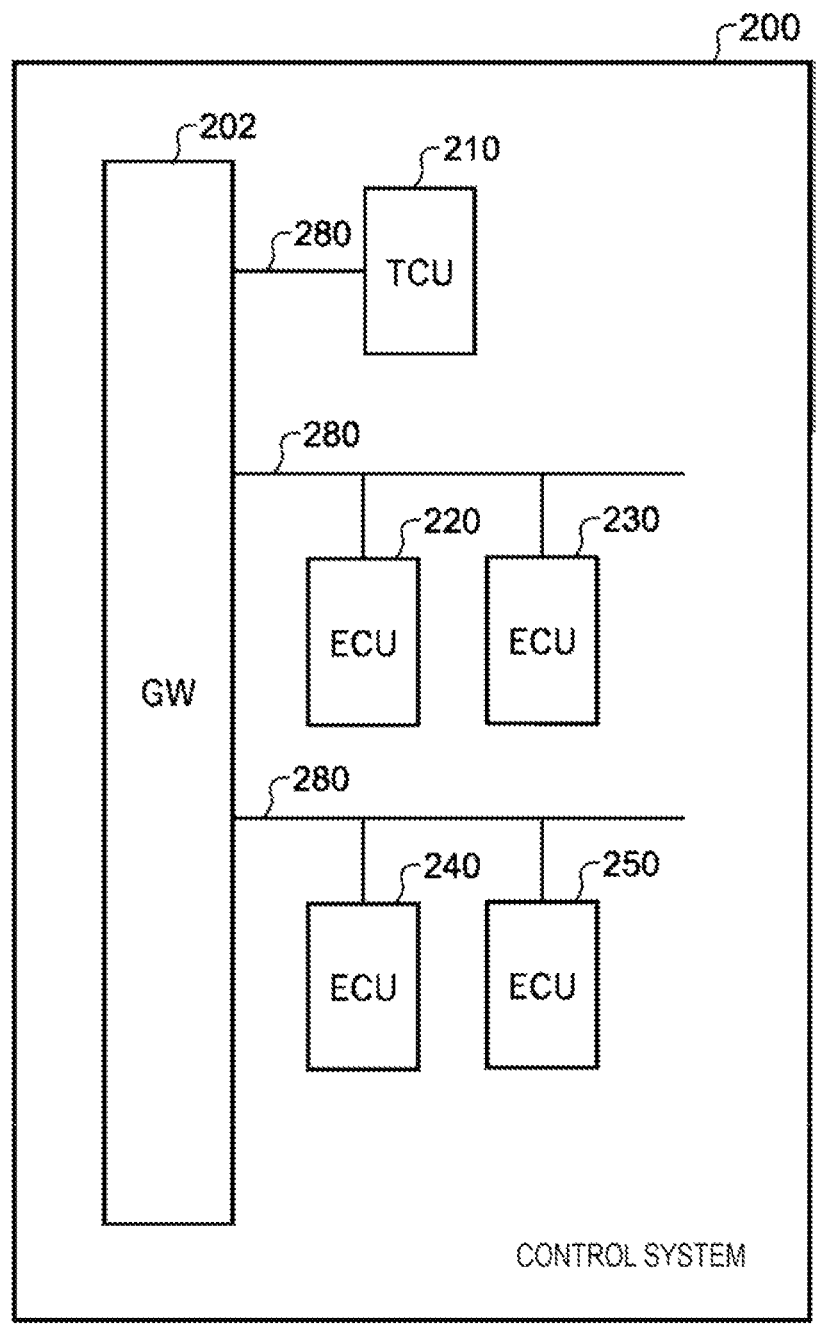
FIG. 2 schematically illustrates a system configuration of a control system 200.

FIG. 2 schematically illustrates a system configuration of the control system 200. The control system 200 includes a TCU 210, a GW 202, and ECUs 220, 230, 240, and 250.

The GW 202 and the ECUs 220, 230, 240, and 250 are electronic control units. Each of the GW 202 and the ECUs 220, 230, 240, and 250 serves as the vehicle controller for controlling the vehicle 20.

The TCU 210 is a telematics control unit. The TCU 210 communicates at least with the mobile communications network 10. The TCU 210 is an example of the communications controller for controlling mobile communications via the mobile communications network 10.

The TCU 210, and the ECUs 220, 230, 240, and 250 are connected to the GW 202 via at least one in-vehicle communications line 280. The TCU 210, and the ECUs 220, 230, 240, and 250 are connected to the in-vehicle communications line 280, and communicate mutually via the in-vehicle communications line 280 and the GW 202. The GW 202 comprehensively controls the TCU 210, and the ECUs 220, 230, 240, and 250. The in-vehicle communications line 280 may be configured to include a controller area network (CAN) and Ethernet. The in-vehicle communications line 280 is an example of a network inside the vehicle 20.

Each of the GW 202 and the ECUs 220, 230, 240, and 250 controls various kinds of devices of the vehicle 20. The devices controlled by the GW 202 and the ECUs 220, 230, 240, and 250 include vehicle drive devices such as an engine or a motor of the vehicle 20, a battery of the vehicle 20, an advanced driver-assistance system (ADAS) of the vehicle 20, and various kinds of auxiliary devices of the vehicle 20. It is noted that although the four ECUs 220, 230, 240, and 250 are provided as an example according to this embodiment, the ECUs of the vehicle 20 are not to be limited to the example in this embodiment. The system configuration of the control system 200 is also not to be limited to the example in this embodiment.

As the present embodiment, a case where, when the attachment to the mobile communications network 10 is rejected, the TCU 210 notifies the ECU 220 that the attachment has been rejected will be described. With the TCU 210 and the ECU 220 being connected via a connection communications network, the TCU 210 may notify the ECU 220 that the attachment has been rejected using a connection message. It is noted that the TCU 210 may notify at least one of the ECUs 230, 240, and 250 other than the ECU 220 that the attachment has been rejected.

The TCU 210 requests the attachment to the mobile communications network 10, and when rejection information of the attachment to the mobile communications network 10 having been rejected is acquired, the TCU 210 notifies the ECU 220 that the attachment has been rejected. Specifically, the TCU 210 transmits a position registration request signal to the mobile communications network 10, and when a position registration rejection message is received in return for the position registration request signal transmitted to the mobile communications network 10, the TCU 210 notifies the ECU 220 that the attachment has been rejected.

When the rejection information is acquired, on condition that a rejection reason of the attachment is a predetermined value indicating that subscriber information could not be authenticated, the TCU 210 may notify the ECU 220 that the attachment has been rejected.

For example, when a predetermined cause value is received from the mobile communications network 10 as the predetermined value, the TCU 210 may notify the ECU 220.

When the rejection information is acquired, on condition that a reason for rejecting the attachment is the predetermined value indicating that subscriber information could not be authenticated, the TCU 210 may notify the ECU 220 that the attachment has been rejected and stop transmitting a random access preamble (RAM).

When the rejection information is acquired, on condition that a rejection reason of the attachment is the predetermined value indicating that subscriber information could not be authenticated, the TCU 210 switches a communications mode with the outside to a predetermined wireless communications mode different from mobile communications.

When notified by the TCU 210 that the attachment has been rejected, the ECU 220 switches to a predetermined control mode associated with communications by the predetermined wireless communications mode.

The predetermined wireless communications mode may be wireless LAN.

When notified by the TCU 210 that the attachment has been rejected, the ECU 220 may output, in association with the information indicating that the attachment has been rejected, information concerning the vehicle 20 collected by the ECU 220. When notified by the TCU 210 that the attachment has been rejected, the ECU 220 may mask a predetermined kind of information among information transmitted to the outside.

As an example of the predetermined kind of information thus masked, position information of the vehicle 20 may be given. When notified by the TCU 210 that the attachment has been rejected, the ECU 220 manages information concerning control conditions of the vehicle 20 collected by the ECU 220 to be distinguished from a case where the attachment is processed normally. For example, when notified by the TCU 210 that the attachment has been rejected, the ECU 220 may store or control to cause another storage medium to store information concerning the vehicle 20 collected during a period in which the attachment is being rejected, in particular, information concerning control states of the vehicle 20 that is exchanged in the communications network of the vehicle 20 so that the information can be distinguished from information collected during a period in which the attachment is being processed normally. The information concerning the vehicle 20 that has been collected during a period in which the attachment is being rejected may be handled as unauthenticated period information.

Figure 3:
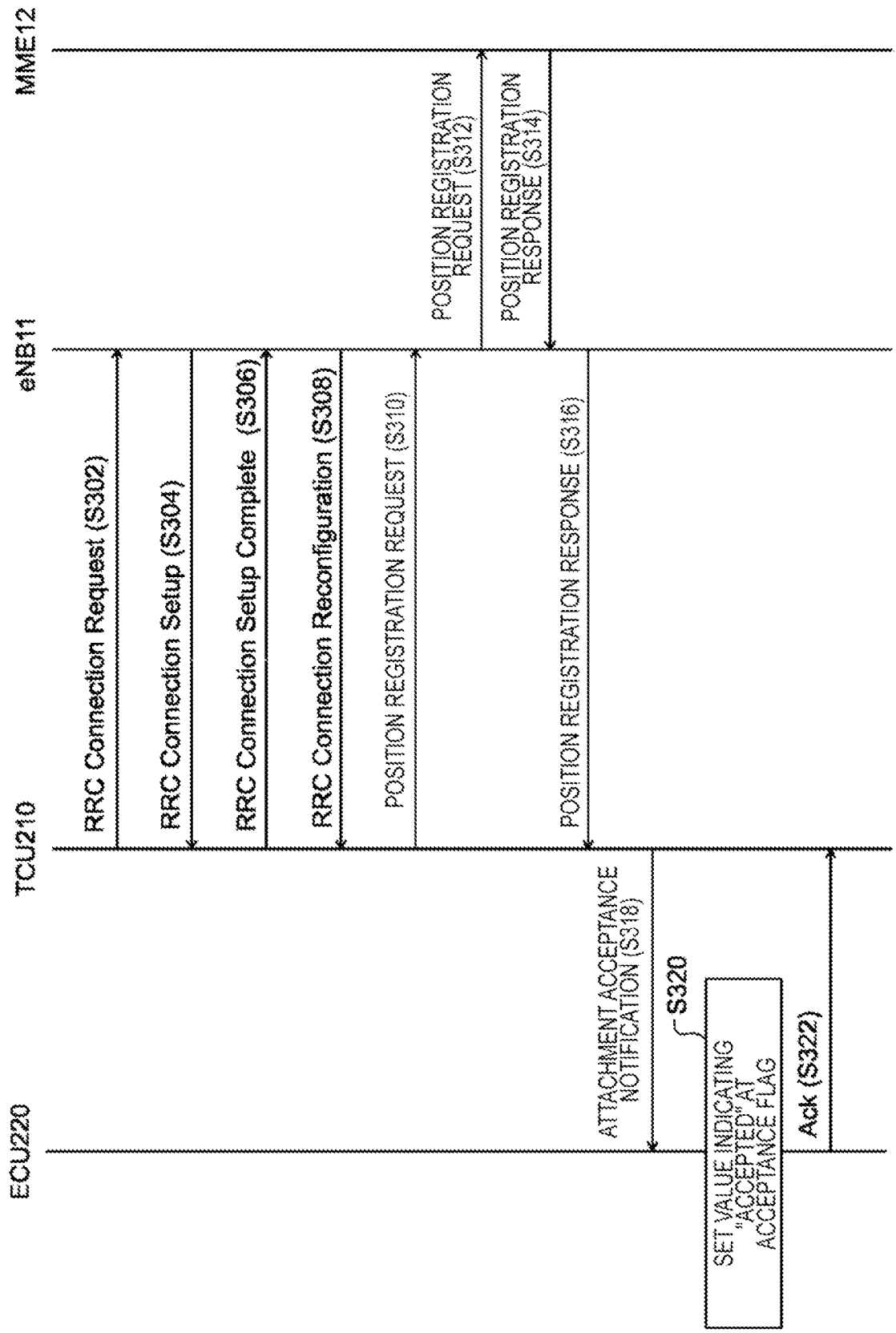
FIG. 3 schematically illustrates a processing sequence regarding attachment processing to a mobile communications network 10.

FIG. 3 schematically illustrates a processing sequence regarding attachment processing to the mobile communications network 10. FIG. 3 illustrates a processing sequence when attachment is accepted in the attachment processing. The processing sequence in FIG. 3 is performed when the IG power source of the vehicle 20 is turned on and when a power source of the TCU 210 is switched from an off state to an on state. The processing sequence in FIG. 3 may be also performed when a SIM-valid contract term of the TCU 210 expires.

At S302, the TCU 210 transmits RRC connection request to the eNB 11 and requests wireless resource connection. At S304, the eNB 11 transmits RRC connection setup to the TCU 210 and notifies initial setting information designating a channel used for communications, for example. At S306, the TCU 210 transmits RRC connection setup complete to the eNB 11 and notifies that setting of the channel used for communications has been completed. At S308, the eNB 11 transmits RRC connection reconfiguration to the TCU 210 and requests reconfiguration of RRC connection.

Next, at S310, the TCU 210 transmits a position registration request to the eNB 11. The position registration request includes subscriber information such as international mobile subscriber identity (IMSI) read from SIM information set in the TCU 210. At S312, the eNB 11 transmits the position registration request to the MME 12. Upon receiving the position registration request, the MME 12 uses terminal identification information in the mobile communications network 10 to perform authentication and position registration in cooperation with the HSS 13, and when the position registration is completed, the MME 12 at S314 transmits a position registration response as a position registration completion signal (attach accept) to the eNB 11. At S316, the eNB 11 transmits the position registration response transmitted from the MME 12 to the TCU 210.

Upon receiving the position registration response indicating that the position registration has been completed from the eNB 11, the TCU 210 at S318 outputs an attachment acceptance notification notifying that the attachment has been accepted, to the ECU 220. At S320, the ECU 220 sets a predetermined value such as 1 indicating "accepted" at the acceptance flag as an internal variable and outputs acknowledgement of the attachment acceptance notification to the TCU 210 at S322.

Figure 4:
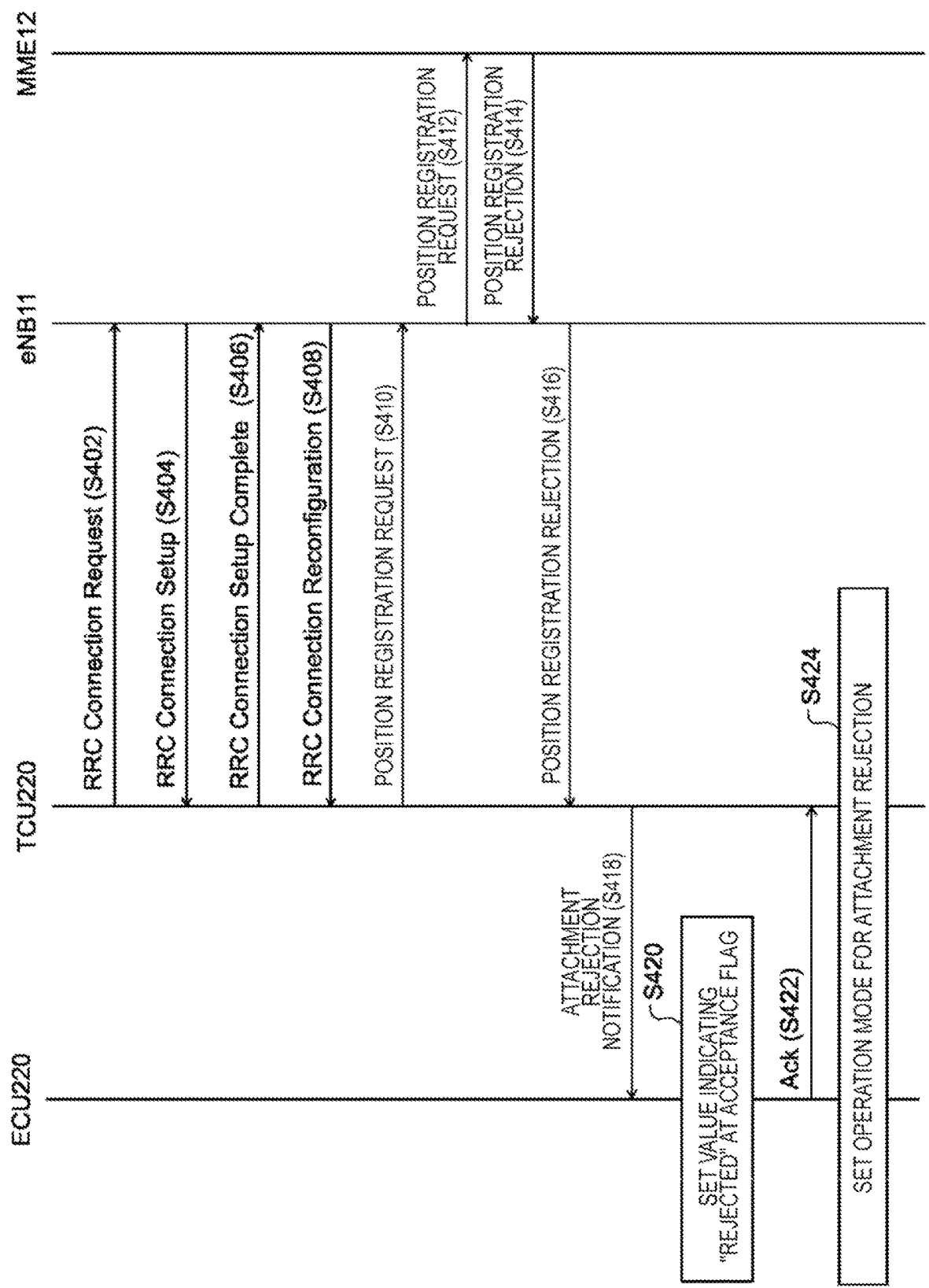
FIG. 4 schematically illustrates a processing sequence regarding attachment processing to the mobile communications network 10.

FIG. 4 schematically illustrates a processing sequence regarding attachment processing to the mobile communications network 10. FIG. 4 illustrates a processing sequence when attachment to the mobile communications network 10 is rejected. Since the processing at S402 to S412 in FIG. 4 is the same as the processing at S302 to S312, the processing at S402 to S412 will not be repeatedly elaborated.

Upon receiving a position registration request at S412, the MME 12 uses the user identification information and attempts authentication in cooperation with the HSS 13. When the authentication ends unsuccessfully, the MME 12 at S414 transmits position registration rejection in the form of a position registration rejection signal (attach reject) to the eNB 11. The position registration rejection includes a cause value which is a value indicating a cause of rejecting the position registration. For example, when the position registration is rejected because the user holds no contract, the position registration rejection includes a specific cause value indicating that the user holds no contract. The specific cause value indicating that the user holds no contract includes "IMSI unknown in HSS."

At S416, the eNB 11 transmits the position registration rejection transmitted from the MME 12 to the TCU 210. When cause value included in the position registration rejection received from the eNB 11 includes a specific value, the TCU 210 at S418 transmits an attachment rejection notification notifying that the attachment has been rejected, to the ECU 220. At S420, the ECU 220 sets a predetermined value such as 0 indicating "rejected" at the acceptance flag as the internal variable and transmits acknowledgement of the attachment rejection notification to the TCU 210 at S422.

At S424, the TCU 210 and the ECU 220 switch to operation modes at the time of attachment rejection. For example, the TCU 210 may switch a wireless communications mode with the outside to a communications mode using wireless LAN or Bluetooth (registered trademark). The TCU 210 may disallow communications with the outside via the mobile communications network 10 for a predetermined period of time. The ECU 220 may operate in an operation mode for a case where the mobile communications network 10 is disallowed. For example, the ECU 220 may disable a communications route using the mobile communications network 10 and enable a communications route using wireless LAN or Bluetooth (registered trademark). The TCU 210 may disallow attempt of the attachment to the mobile communications network 10 until a next start-up of the vehicle 20. The TCU 210 may stop transmitting a random access channel (RACH) to the mobile communications network 10. Thus, the vehicle 20 can be prevented from useless communications via the mobile communications network 10 so as to reduce power consumption by the vehicle 20. The vehicle 20 can be also prevented from useless attachment request to the mobile communications network 10 so as to prevent degradation of radio-wave environment of the mobile communications network 10.

Figure 5:
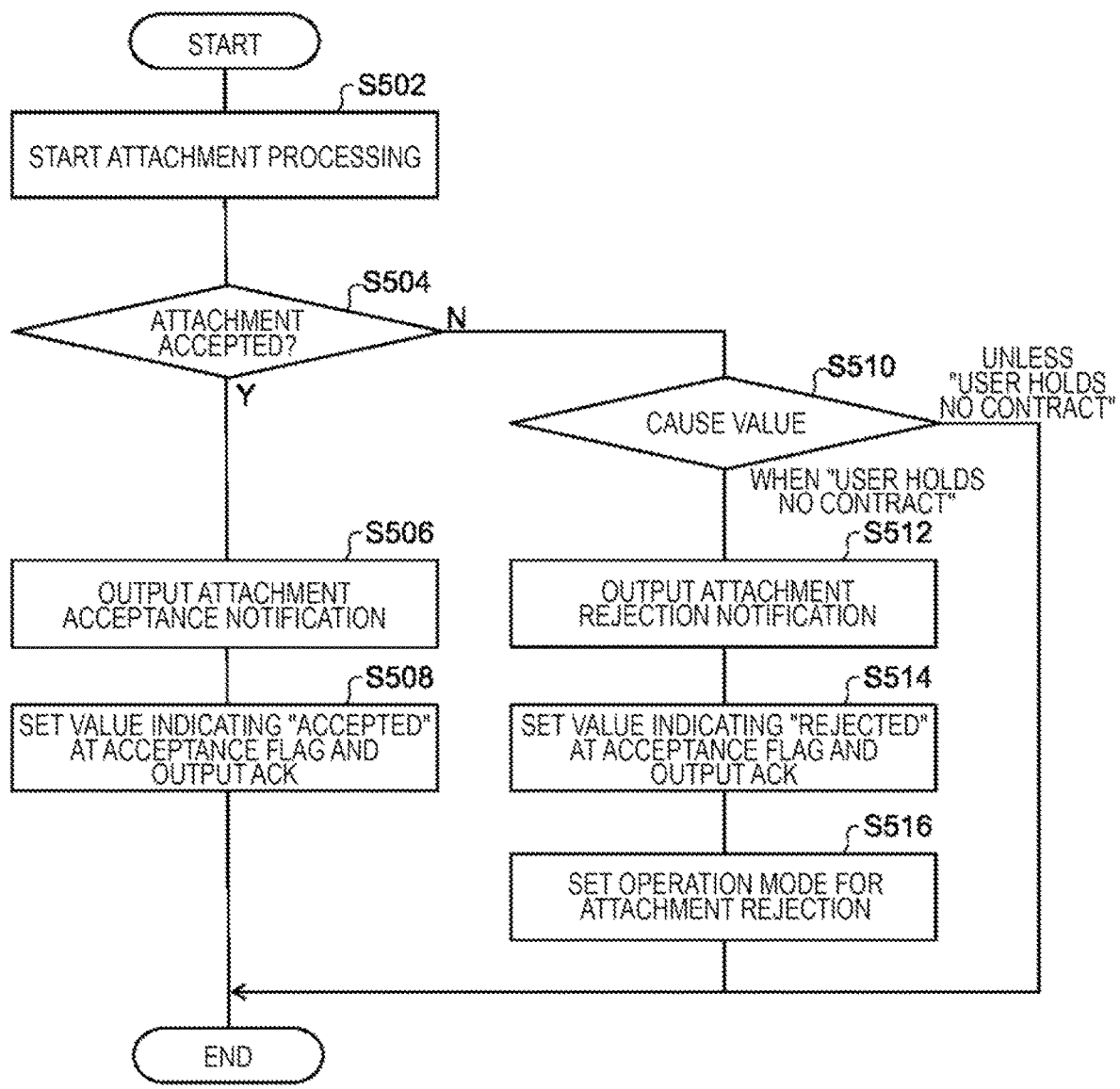
FIG. 5 is a flowchart illustrating an exemplary processing procedure regarding attachment processing by the control system 200.

FIG. 5 is a flowchart illustrating an exemplary processing procedure regarding attachment processing by the control system 200. The processing of the flowchart in FIG. 5 is performed when the power source of the TCU 210 is switched from an off state to an on state. The processing of the flowchart in FIG. 5 may be also performed when the SIM-valid contract term of the TCU 210 expires. At S502, the TCU 210 starts the attachment processing to the mobile communications network 10. For example, the TCU 210 performs processing described in relation to the processing at S302 to S312 in FIG. 3 and the processing at S402 to S412 in FIG. 4.

At S504, the TCU 210 determines whether the attachment has been accepted. For example, when the position registration response described with reference to FIG. 3 is received from the eNB 11, the TCU 210 determines that the attachment has been accepted, and when the position registration rejection described with reference to FIG. 4 is received from the eNB 11, the TCU 210 determines that the attachment has been rejected. When the attachment is accepted, the TCU 210 at S506 outputs an attachment acceptance notification to the ECU 220. At S508, the ECU 220 sets a value indicating "accepted" at the acceptance flag and outputs acknowledgement to the TCU 210.

When it is determined at S504 that the attachment has been rejected, the TCU 210 at S510 judges the cause value included in the position registration rejection. When the cause value is a value indicating that "the user holds no contract," the TCU 210 at S512 outputs an attachment rejection notification to the ECU 220. At S514, the ECU 220 sets a value indicating "rejected" at the acceptance flag and outputs acknowledgement to the TCU 210. At S516, the TCU 210 and the ECU 220 set operation modes at the time of attachment rejection.

FIG. 6 illustrates a data configuration of vehicle data collected and stored by the ECU 220. The ECU 220 stores dates and time, vehicle information, and the acceptance flag in association with one another. The "vehicle information" contains position information of the vehicle 20 and state information of the vehicle 20. As an example of the state information of the vehicle 20, a state of charge of a battery aboard the vehicle 20 may be given.

The "acceptance flag" contains values set at the acceptance flag as the internal variable of the ECU 220. In FIG. 6, "1" indicates that the attachment has been accepted, and "0" indicates that the attachment has been rejected.

When the vehicle data is transmitted to the external device 70, the ECU 220 may mask a specific kind of information among the vehicle information and transmit the same to the external device 70. For example, among the vehicle information, the ECU 220 may mask the position information of the vehicle 20 and transmit the same to the external device 70. For example, among the vehicle information, the ECU 220 may set the position information of the vehicle 20 at a null value and transmit the same to the external device 70. In another example, among the vehicle information, the ECU 220 may delete the position information of the vehicle 20 and transmit the same to the external device 70. It is noted that the ECU 220 may transmit vehicle data including the acceptance flag to the external device 70. When the vehicle data including the acceptance flag is received, the external device 70 may mask and store a specific kind of information among the vehicle information associated with the acceptance flag "0". It is noted that when vehicle data is output to a freely selected external device, the ECU 220 may mask and output a specific kind of information among the vehicle information. For example, when vehicle data is output to a diagnostic tester connected to a diagnostic port of the vehicle 20, the ECU 220 may mask and output a specific kind of information among the vehicle information associated with the acceptance flag "0".

According to the described embodiment, the TCU 210 and the ECU 220 can gain access to contract information in the mobile communications network 10. This enables the TCU 210 and the ECU 220 to recognize a state of a user holding no contract and control operations with respect to the mobile communications network 10.

Figure 7:
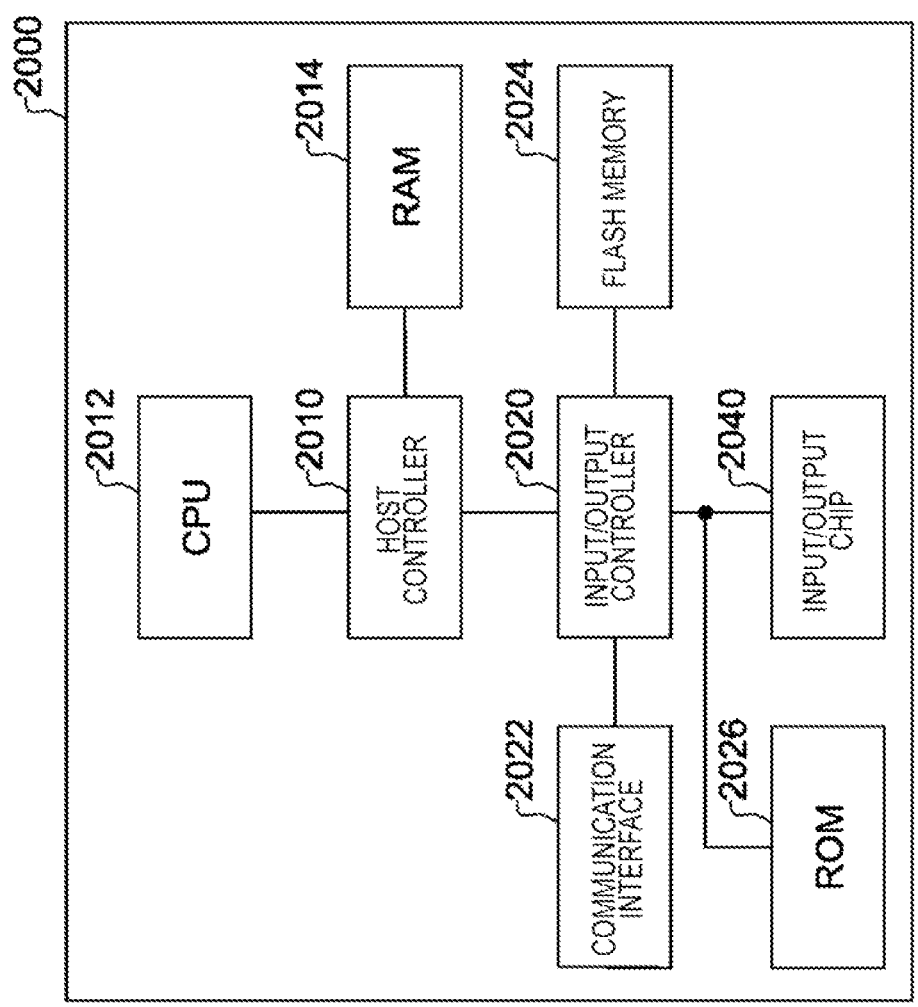
FIG. 7 illustrates an exemplary computer 2000.

FIG. 7 illustrates an exemplary computer 2000 wholly or partly implementable according to a plurality of embodiments of the present invention. A program installed in the computer 2000 can cause the computer 2000 to function as an apparatus such as an information processor according to the embodiments or as each unit of the apparatus, to perform operations associated with the apparatus or each unit of the apparatus, and/or to perform a process according to the embodiments or steps of the process. Such a program may be executed by the CPU 2012 so as to cause the computer 2000 to perform specific operations in association with a processing procedure described in this specification or some or all of the blocks in the block diagram.

The computer 2000 according to this embodiment includes the CPU 2012 and a RAM 2014, which are connected to each other with a host controller 2010. The computer 2000 also includes a ROM 2026, a flash memory 2024, a communications interface 2022, and an input/output chip 2040. The ROM 2026, the flash memory 2024, the communications interface 2022, and the input/output chip 2040 are connected to the host controller 2010 via an input/output controller 2020.

The CPU 2012 operates in accordance with programs stored in the ROM 2026 and the RAM 2014 and controls each unit based on the programs.

The communications interface 2022 communicates with other electronic devices via a network. The flash memory 2024 stores programs and data used by the CPU 2012 in the computer 2000. The ROM 2026 stores a boot program executed by the computer 2000 upon activation and/or programs dependent on hardware of the computer 2000. The input/output chip 2040 may connect various input/output units, such as a keyboard, a mouse, and a monitor, to the input/output controller 2020 via input/output ports, such as a serial port, a parallel port, a keyboard port, a mouse port, a monitor port, a USB port, and an HDMI (registered trademark) port.

Programs are provided through computer-readable storage media, such as a CD-ROM, a DVD-ROM, or a memory card, or via a network. The RAM 2014, the ROM 2026, and the flash memory 2024 are examples of the computer-readable storage media. The programs are installed in the flash memory 2024, the RAM 2014, and the ROM 2026, and executed by the CPU 2012. Information processing written in these programs is read by the computer 2000 and provides cooperation between the programs and various kinds of hardware resources described above. An apparatus or a method may be configured by operations or processing of information in accordance with use of the computer 2000.

For example, when the computer 2000 and an external device communicate with each other, the CPU 2012 may execute a communications program loaded in the RAM 2014 and instruct communications processing to the communications interface 2022 based on processing written in the communications program. Under control of the CPU 2012, the communications interface 2022 reads transmission data stored in a transmission buffer processing region provided in a recording medium, such as the RAM 2014 and the flash memory 2024, transmits the read transmission data to a network, and writes reception data received from the network in a reception buffer processing region provided in the recording medium.

The CPU 2012 may cause the RAM 2014 to read a whole or a required part of a file or a database stored in a recording medium such as the flash memory 2024, and may subject the data in the RAM 2014 to various kinds of processing. Next, the CPU 2012 writes back the processed data in the recording medium.

Various types of programs, and various types of information, such as data, tables, and databases, may be stored in the recording medium and subjected to information processing. The CPU 2012 may subject the data read from the RAM 2014 to various kinds of operations described in this specification and designated by an instruction sequence of a program, and various kinds of processing including information processing, condition determination, conditioned divergence, unconditioned divergence, and information search/replacement. The CPU 2012 writes back a result on the RAM 2014. The CPU 2012 may search information in a file and a database in the recording medium. For example, when the recording medium stores a plurality of entries including attribute values of a first attribute, each of which is associated with an attribute value of a second attribute, the CPU 2012 may search an entry that is designated by the attribute value of the first attribute and that accords with a condition among the plurality of entries. The CPU 2012 may read an attribute value of the second attribute stored in the entry so as to acquire the attribute value of the second attribute associated with the first attribute that satisfies the predetermined condition.

The described program or software module may be stored on a computer-readable storage medium in the computer 2000 or in the vicinity of the computer 2000. A recording medium, such as a hard disk or a RAM, provided in a server system connected to a dedicated communications network or the Internet may be employed as the computer-readable storage medium. A program stored in the computer-readable storage medium may be provided for the computer 2000 via a network.

The programs, which are installed in the computer 2000 and cause the computer 2000 to function as the control system 200, may operate the CPU 2012 to cause the computer 2000 to function as each unit of the control system 200. The information processing written in these programs is read by the computer 2000 so as to function as each unit of the control system 200, which is a specific measure of cooperation of software with the described various kinds of hardware resources. Such specific measures calculate or process information in accordance with an intended purpose of the computer 2000 according to this embodiment, thus configuring the control system 200 peculiar to the intended purpose.

Various embodiments have been described with reference to the block diagram and other drawings. Each block in the block diagram may refer to 1) a process step where an operation is performed or 2) each unit of an apparatus serving to perform the operation. A specific step and each unit may be provided with a dedicated circuit, a programmable circuit supplied with a computer-readable instruction stored on the computer-readable storage medium, and/or a processor supplied with the computer-readable instruction stored on the computer-readable storage medium. The dedicated circuit may include a digital and/or analog hardware circuit, and may include an integrated circuit (IC) and/or a discrete circuit. The programmable circuit may include a reconfigurable hardware circuit including logical AND, logical OR, logical XOR, logical NAND, logical NOR, and other logical operation circuit, and a memory element, such as a flip-flop, a register, a field-programmable gate array (FPGA), and a programmable logic array (PLA).

The computer-readable storage medium may include a freely selected concrete device where an instruction executed by an appropriate device is storable. As a result, the computer-readable storage medium including the stored instruction constitutes at least part of a product including instructions that can be executed to provide measures for performing operations designated by the processing procedure or the block diagram. Examples of the computer-readable storage medium may include an electronic storage medium, a magnetic storage medium, an optical storage medium, an electromagnetic storage medium, and a semiconductor storage medium. More specific examples of the computer-readable storage medium may include a floppy (registered trademark) disk, a diskette, a hard disk, a random-access memory (RAM), a read-only memory (ROM), an erasable programmable read-only memory (EPROM or flash memory), an electrically erasable read-only memory (EEPROM), a static random-access memory (SRAM), a compact disk read-only memory (CD-ROM), a digital multi-purpose disk (DVD), a Blu-ray (registered trademark) disk, a memory stick, and an integrated circuit card.

The computer-readable instruction may include either a source code or an object code written in one or a freely selected combination of a plurality of programming languages including an assembler instruction, an instruction set architecture (ISA) instruction, a machine instruction, a machine-dependent instruction, a microcode, a firmware instruction, state setting data, an object-oriented programming language, such as Smalltalk (registered trademark), JAVA (registered trademark), and C++, and a conventional procedural language such as a "C" programming language or a similar programming language.

A computer-readable instruction may be provided for a processor or a programmable circuit of a general-purpose computer, a special-purpose computer, or other programmable data processing apparatus locally or via a local area network (LAN) or a wide area network (WAN) such as the Internet. The computer-readable instruction may be executed to provide measures for performing operations designated by the described processing procedure or the block diagram. Examples of the processor may include a computer processor, a processing unit, a microprocessor, a digital signal processor, a controller, and a microcontroller.

While the embodiments of the present invention have been described, the technical scope of the invention is not limited to the above-described embodiments. It is apparent to persons skilled in the art that various alterations and improvements can be added to the above-described embodiments. It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

EXPLANATION OF REFERENCES

10: mobile communications network
11: eNB
12: MME
13: HSS
20: vehicle
70: external device
90: communications network
200: control system
202: GW
210: TCU
220: ECU
230: ECU
240: ECU
250: ECU
280: in-vehicle communications line
2000: computer
2010: host computer
2012: CPU
2014: RAM
2020: input/output controller
2022: communications interface
2024: flash memory
2026: ROM
2040: input/output chip

What is claimed is:

1. A control system comprising:
a mobile object controller configured to control a mobile object; and
a communications controller configured to control mobile communications via a mobile communications network,
wherein when the communications controller requests attachment to the mobile communications network and acquires rejection information of the attachment to the mobile communications network having been rejected, the communications controller is configured to notify the mobile object controller that the attachment has been rejected, and
when notified by the communications controller that the attachment has been rejected, the mobile object controller is configured to mask a predetermined kind of information among information transmitted to an outside.

2. The control system according to claim 1, wherein when the communications controller transmits a position registration request signal to the mobile communications network and receives a position registration rejection message in return for the position registration request signal transmitted to the mobile communications network, the communications controller is configured to notify the mobile object controller that the attachment has been rejected.

3. The control system according to claim 2, wherein when the rejection information is acquired, on condition that a rejection reason of the attachment is a predetermined value indicating that subscriber information could not be authenticated, the communications controller is configured to notify the mobile object controller that the attachment has been rejected.

4. The control system according to claim 3, wherein when, as the predetermined value, a predetermined cause value is received from the mobile communications network, the communications controller is configured to notify the mobile object controller.

5. The control system according to claim 3, wherein when the rejection information is acquired, on condition that the rejection reason of the attachment is the predetermined value indicating that subscriber information could not be authenticated, the communications controller is configured to notify the mobile object controller that the attachment has been rejected, and also to stop transmitting a random access preamble (RACH).

6. The control system according to claim 3, wherein when the rejection information is acquired, on condition that the rejection reason of the attachment is the predetermined value indicating that subscriber information could not be authenticated, the communications controller is configured to switch a communications mode with an outside to a predetermined wireless communications mode different from the mobile communications.

7. The control system according to claim 2, wherein when notified by the communications controller that the attachment has been rejected, the mobile object controller is configured to manage information concerning control conditions of the mobile object collected by the mobile object controller to be distinguished from a case where the attachment is processed normally.

8. The control system according to claim 1, wherein when the rejection information is acquired, on condition that a rejection reason of the attachment is a predetermined value indicating that subscriber information could not be authenticated, the communications controller is configured to notify the mobile object controller that the attachment has been rejected.

9. The control system according to claim 8, wherein when, as the predetermined value, a predetermined cause value is received from the mobile communications network, the communications controller is configured to notify the mobile object controller.

10. The control system according to claim 8, wherein when the rejection information is acquired, on condition that the rejection reason of the attachment is the predetermined value indicating that subscriber information could not be authenticated, the communications controller is configured to switch a communications mode with an outside to a predetermined wireless communications mode different from the mobile communications.

11. A mobile object comprising the control system according to claim 1.

12. The mobile object according to claim 11, wherein the mobile object is a vehicle.

13. A control system comprising:
a mobile object controller configured to control a mobile object; and
a communications controller configured to control mobile communications via a mobile communications network,
wherein when the communications controller requests attachment to the mobile communications network and acquires rejection information of the attachment to the mobile communications network having been rejected, the communications controller is configured to notify the mobile object controller that the attachment has been rejected, and
wherein when the rejection information is acquired, on condition that a rejection reason of the attachment is a predetermined value indicating that subscriber information could not be authenticated, the communications controller is configured to notify the mobile object controller that the attachment has been rejected, and also to stop transmitting a random access preamble (RACH).

14. The control system according to claim 13, wherein the predetermined wireless communications mode is wireless LAN.

15. The control system according to claim 13, wherein when notified by the communications controller that the attachment has been rejected, the mobile object controller is configured to switch to a predetermined control mode associated with communications by the predetermined wireless communications mode.

16. A control system comprising:
a mobile object controller configured to control a mobile object; and
a communications controller configured to control mobile communications via a mobile communications network,
wherein when the communications controller requests attachment to the mobile communications network and acquires rejection information of the attachment to the mobile communications network having been rejected, the communications controller is configured to notify the mobile object controller that the attachment has been rejected, and
wherein when notified by the communications controller that the attachment has been rejected, the mobile object controller is configured to manage information concerning control conditions of the mobile object collected by the mobile object controller to be distinguished from a case where the attachment is processed normally.

17. A control system comprising:
a mobile object controller configured to control a mobile object; and
a communications controller configured to control mobile communications via a mobile communications network,
wherein when the communications controller requests attachment to the mobile communications network and acquires rejection information of the attachment to the mobile communications network having been rejected, the communications controller is configured to notify the mobile object controller that the attachment has been rejected, and
wherein when notified by the communications controller that the attachment has been rejected, the mobile object controller is configured to output, in association with information indicating that the attachment has been rejected, information concerning control conditions of the mobile object collected by the mobile object controller.

18. A control method comprising:
requesting attachment to a mobile communications network; and
when rejection information of the attachment to the mobile communications network having been rejected is acquired, notifying a mobile object controller connected to a network inside a mobile object and configured to control the mobile object that the attachment has been rejected, and
when notified, to the mobile object controller, that the attachment has been rejected, masking a predetermined kind of information among information transmitted to an outside.

19. A non-transitory computer-readable storage medium having stored thereon a program that causes the computer to function as:

a mobile object controller configured to control a mobile object; and
a communications controller configured to control mobile communications via a mobile communications network,
the program causing the communications controller to perform operations comprising:
requesting attachment to the mobile communications network; and
when rejection information of the attachment to the mobile communications network having been rejected is acquired, notifying the mobile object controller that the attachment has been rejected, and
the program causing the mobile object controller to, when notified by the communications controller that the attachment has been rejected, mask a predetermined kind of information among information transmitted to an outside.

* * * * *